Sept. 6, 1966 N. W. DAW 3,271,512

COLOR TELEVISION METHOD AND APPARATUS EMPLOYING DIFFERENT SETS OF TARGET PHOSPHORS, ONE OF WHICH LUMINESCES IN A SINGLE COLOR AND ANOTHER OF WHICH LUMINESCES IN DIFFERENT COLORS

Original Filed Nov. 14, 1961

INVENTOR.

Nigel W. Daw

BY

Brown and Mikulka

ATTORNEYS

United States Patent Office 3,271,512

Patented Sept. 6, 1966

3,271,512

COLOR TELEVISION METHOD AND APPARATUS EMPLOYING DIFFERENT SETS OF TARGET PHOSPHORS, ONE OF WHICH LUMINESCES IN A SINGLE COLOR AND ANOTHER OF WHICH LUMINESCES IN DIFFERENT COLORS

Nigel W. Daw, Baltimore, Md., assignor to Polaroid Corporation, Cambridge, Mass., a corporation of Delaware Continuation of application Ser. No. 152,283, Nov. 14, 1961. This application Oct. 12, 1965, Ser. No. 500,482
15 Claims. (Cl. 178—5.2)

Figures 1, 2, 3:
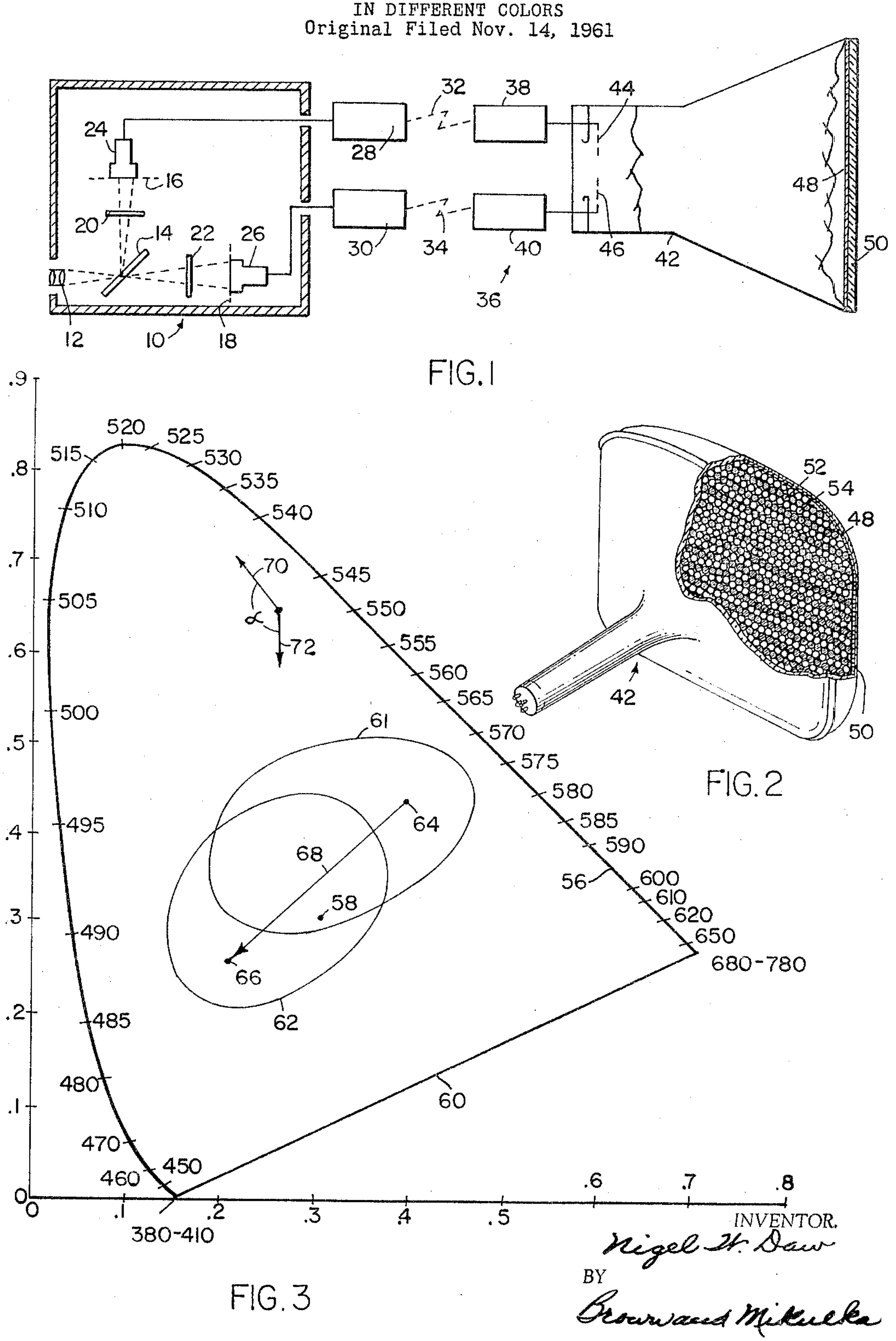

The present application is a continuation application of application Serial No. 152,283, filed November 14, 1961, now abandoned.

This invention relates to a method and apparatus for producing cathode-ray tube images in color, and more particularly, to a method and apparatus for producing television images in a substantially complete range of color from only two component images wherein a novel composition of the target screen of the cathode-ray tube is employed to provide an improvement in color rendition.

As is well known, the usual practice in scanning subject material by television pickup apparatus is to divide the color content of the subject into a plurality of color-separation images. In one adaptation of this procedure it is also known that a multi-colored image may be synthesized from two color-separation component images, one of which is rendered in a color and the other of which is rendered in black-and-white. The production of such a multi-colored image by methods based on bi-stimulus phenomena has been described, for example, in connection with both photographic processes and the television arts. Examples of literature relating to this area of photography are: "Colour Cinematography," pages 260–261, Chapman and Hall, 1951; E. Land, "Experiments in Color Vision," Scientific American, May 1959, page 84; F. Bello, "An Astonishing New Theory of Color," Fortune, May 1959, page 144. Examples of disclosures relative to bi-stimulus phenomena in the television field may be found in copending United States patent applications Serial No. 504,545, filed April 28, 1955, now Patent No. 3,003,391; Serial No. 809,407, filed April 29, 1959; and Serial No. 42,605, filed July 13, 1960, now abandoned.

In a typical example of a photographic process based upon "bi-stimulus phenomena," two black-and-white diapositive color-separation records of a scene are formed, one, for example, involving exposure of the predominantly cool color content of the scene through a green filter and the other exposure of the predominantly warm color content through a red filter. One of the diapositives, preferably the one formed by exposure through the green filter, is then projected in white light. The other diapositive is projected in light of approximately the color of the taking filter, in this example red. The two images are projected in proper register with one another and the composite image thus produced appears in a full range of colors.

It is common practice in color television systems to incorporate means for producing a plurality of signals, each being representative of light of a predeterminedly different band of frequencies emanating from scanned subject matter. Such means usually comprises separate pickup scanning devices, one for each set of signals, operated synchronously. For example, the scanning devices may take the form of standard image-orthicon camera tubes, similar to the camera tubes employed in standard black-and-white broadcasting. By providing color-separation means, such as dichroic mirrors or filters, positioned between the tubes and the scanned scene, the images formed at each tube are selectively representative of the individual colored portions of the subject. In the camera tubes, each image is converted to a corresponding electrical signal in a well-known manner, and these signals are transmitted by appropriate known means to a receiver, the latter including means for transforming the signals into a visible image of the scanned scene which is rendered in a gamut of color.

Current color television practice is most frequently based upon tri-color separation and reproduction. However, in the aforesaid copending applications, there has been disclosed a color television system in which the scanned subject matter is separated into two color-separation signals which are employed to provide selective excitation by electron beam producing means of two, given, relatively different sets of phosphors of a cathode-ray tube in a television receiver.

In one of the embodiments disclosed in the aforementioned patent application Serial No. 42,605, the phosphors are so chosen that one type thereof emits, under excitation, light which is termed "achromatic" while the other emits light which is colored and termed "chromatic." The term achromatic, as thus employed, refers to light which, when used to stimulate the retina uniformlly at a level of approximately 80 decibels, appears to be substantially neutral or white. The whiteness of this light is understood to include light of such pale hue that, alone, it would normally be accepted by an observer as substantially white, e.g., light approximating daylight, the light from a tungsten lamp, and the like. When a phosphor emitting white light is positioned contiguous with one emitting light having a definite color characteristic, the light from the first-named phosphor may possibly appear hued also. Generally, however, any color which may thus be perceptible is of such low saturation as to be regarded as substantially achromatic or white. The term chromatic, as used in the above-mentioned patent application Serial No. 42,605, refers to radiation in the form of visible light having a dominant wavelength of more than 580 mμ.

Further referring to the disclosure of the aforementioned patent application Serial No. 42,605, each set of phosphors has been described as individually excited to emission by the color-separation signals derived from one of the camera pickup or scanning devices, one phosphor luminescing in the red and the other white. The images formed by the color-separation means, above described, and the signals associated therewith have been designated the long record and the short record. The terms "long" and "short" here refer to the relative wavelengths of bands of visible light passed by the color-separation means. Thus, the long record relates to the signal associated with a filter which transmits relatively longer wavelengths of the visible spectrum, such as a red filter; the short record to the signal associated with a filter transmitting light of wavelengths which are relatively shorter than those passed by the red filter, for instance, a green filter. The excitation of the so-called chromatic or red light-emitting phosphor is controlled by the long record while the excitation of the white-light-emitting phosphor is controlled by the short record. Therefore, the total image formed on the target screen of the kinescope comprises a white image derived from the short record and a red image derived from the long record. The images, when properly registered, reproduce the original scene in a range of substantially natural appearing colors.

From a consideration of the above-described television system, it will be noted that the visible image is formed from two categories of light which may, appropriately, be termed viewing stimuli and which differ relatively in wavelength content. Light emitted by the red phosphor as provided by the long record serves as what may be categorized as the long stimulus and that emitted by the white phosphor, responsive to the short record, as the short stimulus. The wavelength characteristics of at least one of the viewing stimuli will, however, be noted as differing somewhat from those of the combination of red and green taking filters of the pickup components.

Phosphors are termed long and short stimulus phosphors herein according to the aforesaid function of the light which they emit as stimuli. A considerable choice of pairs composed of long and short viewing stimuli is possible for obtaining images embodying a gamut of color, as pointed out in the aforesaid copending patent applications. Such a wide choice is indicated in the chromaticity diagram of FIG. 3, to be described hereinafter. However, the present invention is to be considered as primarily pointed to the use of pairs of viewing stimuli wherein one stimulus of each pair is essentially, or in what may be termed its overall characterization, substantially white light.

With the exception of television apparatus, such as hereinbefore described, which employs the synthesis of long and short records to produce color, the use of white-light-emitting phosphors in television has, in general, been limited to black-and-white or monochrome receivers. Phosphors, generally, when subjected to electromagnetic excitation, emit radiation proportionately to the level of excitation over a range of such levels. White light-emitting phosphors may exhibit changes in spectral emission characteristics with changes in irradiation current density used in their excitation. This has usually been considered undesirable and the practice has been to match the components of a phosphor carefully so that the shape of the spectral curve of emission does not vary with intensities of irradiation. One method has involved employing a pair of these phosphors having emission characteristics such that, responsive to a range of intensities or current densities of the exciting signals, the total mixed emission of the phosphor pair exhibits little, if any, noticeable color characteristic or shift regardless of variations in the luminous intensity of emission. Thus, for example, the light emitted by a mixed phosphor which might exhibit a shift to yellow at higher intensities of excitation is masked or corrected by replacing a phosphor component with one which is blue-emitting at comparable excitation intensities. Examples of such a pair of phosphors is the combination of rbhdl.-$Zn_2SiO_4$:Ti or monocl.-$CaMg(SiO_3)_2$:Ti with rbhdl.-$Zn_8BeSi_5O_{19}$:Mn. The art of employing complementary phosphors to mask or offset one another and thereby provide a substantially invariable overall spectral response, throughout a large range of luminous emission intensities, is well developed, several examples of the art being set out in Table 21, opp. p. 421 in Luminescence of Solids, H. W. Leverenz, J. Wiley & Sons, 1950.

It has been found, in the technique of forming images exhibiting a gamut of colors through the instrumentality of pairs of viewing stimuli such as the long and short stimuli, above described, in which, for example, the short stimulus is provided by predominatly non-chromatic or essentially white light, that the color rendition is improved and the saturation of the colors of the synthesized colored image is enhanced and intensified by producing an image in which the short viewing stimulus serves a dual function in that it provides a warm or yellowish hue for high light intensity (low density) areas of the subject and a cool or bluish hue for low light intensity (high density) areas.

The present invention is primarily concerned with adapting the benefits of the foregoing shifts in hue with variations in image intensity to the field of television, particularly with respect to a television system utilizing the above-described long and short stimulus principle, to obtain images which possess markedly improved color characteristics. This application of the phenomenon, involving a non-linear relationship between irradiation current density and the resulting luminous intensity, is in sharply defined contrast to conventional cathode-ray tube and television phosphor practices wherein high conversion efficiency, a linear relation between irradiation current density and luminous intensity, and an emission color or non-color characteristic that remains constant over a wide range of irradiation current densities are usually desired. Contributive to its broad objective, the invention is particularly pointed toward the employment in the target screen of a picture tube of special phosphors, phosphor combinations, phosphor poisons, phosphor flux, and the like to predeterminedly vary the luminous intensities of light emission and provide in colored television images the aforementioned advantages.

In accordance with the foregoing considerations, a principal object of the present invention is to provide a simplified and improved method for color television transmission and reproduction together with apparatus suitable for its practice. Other objects are to provide improved television apparatus employing bi-stimulus means to provide images which exhibit a gamut of color; to provide novel television picture tube target screen means for producing an improved multicolor image in a television system wherein but two types of signal intelligence are picked up and transmitted; and to provide novel combinations of phosphors with one another and with other materials such as phosphor poisons for achieving improved television images in a range of colors.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a schematic diagram of a television system embodying the invention;

FIG. 2 is a diagrammatic perspective view of a cathode-ray or television picture tube of the invention, partly broken away and exaggerated with respect to the structure of the target screen for reasons of clarity; and FIG. 3 is a graphical representation of a chromaticity diagram illustrating a range of light emission characteristics of phosphors employed in a target screen of the invention to provide an improved gamut of color.

Referring now to the drawing, there is shown, schematically, in FIG. 1, a television system embodying the present invention. The system includes a camera or pickup device 10 having a lens system 12 for forming an image of a subject, not shown. Disposed in the path of light from lens system 12 is a means such as a semi-reflecting mirror 14 for splitting the light into a pair of subsidiary beams which form images at respective focal planes 16 and 18. In the form shown, mirror 14 is of a conventional half-silvered type which is partially specularly reflective and in part transmissive of incident light. In an alternative form, mirror 14 may be of a dichroic type which has selective color transmission and reflection properties. Positioned in the respective paths of the subsidiary beams are means, such as individual filters 20 and 22, each of which selectively transmits only a predetermined range or band of visible light frequencies.

In a preferred embodiment, filter 20 may appropriately be a Wratten No. 24, filter, manufactured by Eastman Kodak Company, of Rochester, New York, U.S.A., and characterized by being opaque to relatively cool visible radiation of less than approximately 580 millimicrons. Filter 22 is, preferably, a Wratten No. 58 filter, also manufacture by Eastman Kodak Company, and characterized by being transmissive of relatively warm visible radiation substantially between 480 to 600 millimicrons.

While a device such as element 14 for splitting the beam of light is particularly suitable because of its simplicity, it is to be understood that the invention is not limited thereto and that any suitable scanning or pickup means for forming the images may be utilized. In the example shown, there is employed a pair of image pickup elements 24 and 26 which may, suitably, be provided in the form of Image Orthicons No. 7513, manufactured by Radio Corporation of America, New York, New York, U.S.A. The respective images are focused upon the orthicons at focal planes 16 and 18 and are translated into corresponding sets of electrical signals, one set being representative of the light of relatively long wavelengths, e.g., the predominantly reddish or warm light emanating from the subject, and the other set being representative of the light of relatively short wavelengths, e.g., the predominantly greenish or cool light emanating therefrom. Both sets of signals are fed into transmitting means, indicated at 28 and 30, which may be assumed to include standard signal processing equipment such as amplifiers used for amplifying the signals to a level necessary for modulating a transmitter. The specific circuitry of the transmitting means is not shown, it being understood that any of the many known signal transmission or broadcast systems may be employed. Thus, for example, it is to be understood that each of the image orthicons has associated therewith the usual horizontal and vertical deflection signal generators for producing sweep signals.

Standard NTSC color signals currently used in television transmission are based upon three color-separation images. Signals corresponding to only two of these images, selected in accordance with the teachings herein, are employable in the persent invention as the long and short records heretofore described. The transmission paths 32 and 34 are intended merely to indicate the existence of broadcast signals, it being apparent that closed circuit means such as coaxial cables may, alternatively, be employed. The image-receiving system 36 is to be understood as including generally conventional components such as a pair of video frequency amplifiers 38 and 40 for amplifying the received signals to a level adapted to provide an operating input to a cathode-ray tube such as kinescope 42. The receiver 36 may, for example, also include the customary detectors and RF amplifier, not shown. The respective signals, constituting the outputs of video amplifiers 38 and 40, are impressed upon the grids 44 and 46 of the picture tube 42. The kinescope 42 may be of a generally conventional basic type as, for example, it may be similar to the one-gun type suggested by R. R. Law in Proceedings of The Institute of Radio Engineers, New York, N.Y., October 1951, vol. 39, No. 10, p. 1194, modified in accordance with the teachings herein. or it may comprise a multiple gun, single envelope, cathode-ray tube. Elements on the kinescope, such as electron gun, intensity, focussing, deflecting, or beam convergence means, have been omitted from the drawing inasmuch as they are non-essential to an understanding of the invention. Recently developed electroluminescent, solid state, image-forming devices are also employable such as the image-display device described in British Patent No. 827,712, issued February 10, 1960, to Sylvania Electric Products, Inc., New York, N.Y., U.S.A.

A preferred embodiment of kinescope 42, as shown schematically in FIG. 2, is characterized by a target screen 48 composed of a predetermined array of luminescent phosphor elements of a minute configuration such as dots formed on the inner surface of a light-transmitting base or carrier plate 50 which may, for example, constitute the face plate of the tube. The phosphor dots of target screen 48 comprise two distinct sets thereof, the dots of one set being interspersed with those of the other in a regular repetitive pattern. One set or array of phosphor components 52, when excited by long record initiated electron impingement thereon, emits light constituting the long stimulus, previously described, namely, light of a warm or predominantly reddish color. The other set of phosphor components 54, under excitation by short record initiated electrons, emits light which constitutes the short stimulus, that is essentially white light. The foregoing phosphor emission characteristics enable the production of a multicolored image of high quality, particularly when the long and short records are derived from red and green color-separation images.

The output of video amplifier 38, which is that of the long record derived from the interposition in the camera 10 of filter 20, is fed to the grid 44 of the electron gun employed to excite throughout a range of excitation levels the reddish-light-emissive set of phosphor dots 52. The output of amplifier 40, which is that of the short record obtained by interposition of the filter 22, is employed to energize the grid of the electron gun used to excite, over a similar range of excitation levels, the non-red or white-light-emissive set of dots 54. The electron beams from the grids 44 and 46, being energized and scanned substantially simultaneously, thus form a composite image in terms of red and white light which, through the abovementioned phenomenon, serves to reproduce the original scene in full color. Inasmuch as the quality of the color rendition would be impaired by misregistration of the two images, it is to be understood that the signals transmitted to the receiver 36 include the usual sync signal. Receiver 36, accordingly, will be understood as comprising the usual synch separators and horizontal and vertical deflection generators for maintaining proper image registration.

Turning now more particularly to the structure of the target screen, it will be recalled that a principal objective of the invention is to provide a predominantly white-light-emitting phosphor or phosphors serving to produce an essentially white light or short stimulus of a bi-stimulus system which, in response to short record variations in irradiation current densities, is adapted to emit light of a warm or yellowish hue for image areas of high intensity, that is, the highlights, and light of a bluish hue for image areas of low intensity, namely, the shadows. This result may be attained through various instrumentalities relating to the luminescent prosphors of the screen which will be described in detail. It is, of course, to be understood that the target screen is also composed of a plurality of warm color or reddish-light-emitting phosphor elements 52. Inasmuch as they are preferably composed of a phosphor or phosphors, such as rbhdl.-$Zn_8BeSi_5O_{19}:Mn(2.4)$ (with red optical filter) or $$Cd_2B_2O_5:Mn$$

which may be of a conventional type used in color television, no detailed description thereof is considered to be necessary.

As previously intimated, the "white"-light-emitting phosphor components of the screen, providing the short stimulus, are required to emit at least two functional bands of wavelengths in the visible spectrum and to function in a manner such that the ratio of emission between these bands varies with the intensity of irradiation. This can be accomplished, for example, by combining two phosphors having different bands of emission, or by employing a phosphor which combines two such bands in a single lattice structure.

Assuming the combination of two phosphors of the aforementioned type as composing the short-stimulus-providing set of screen components, at least one of the phosphor elements thereof is characterized by its ability to provide a broad band of essentially white light emission which is not linearly proportional to the intensity of irradiation. A phosphor may thus be caused to function in several ways, as follows: (1) By providing for a given chosen phosphor irradiation which is so intense that the phosphor becomes saturated, resulting in its emitting a less-than-customary amount of light at high intensities of irradiation or, otherwise stated, resulting in its reaching a point where increases in irradiation cease to produce linear increases in luminosity; (2) By poisoning the phosphor with small quantities of metals such as iron, cobalt or nickel so that it emits a lesser amount of light than usual at low intensities of irradiation; (3) By employing a modified flux in forming the phosphor composition which, again, contributes to its less-than-normal light emission at low intensities of irradiation. In the two last-named instances, namely, those of poisoning the phosphors or modifying the phosphor flux, a reduction in emission efficiency may also occur to some extent at high levels of excitation.

Referring to the first of the above-mentioned methods (1), the "white"-light-emissive phosphor elements 54, interspersed with the red-light-emissive phosphor elements 52, which together make up the target screen, may, suitably, be composed of the combination, in proper amounts, of a blue-light-emiting sulphide phosphor, such as a zinc-cadmium sulphide phosphor activated with silver (Zn:Cd)(S):Ag and a yellow-light-emitting silicate phosphor, such as rbhdl.-$Zn_8BeSi_5O_{19}$:Mn. The aforesaid blue-light-emitting phosphor dominates at low excitation intensities and commences to saturate at the relatively higher intensities of image formation; the yellow-light-emitting phosphor, however, does not become saturated at high excitation intensities. Thus, the yellow-light-emitting phosphor is in the ascendant at high intensity image areas, producing a slightly yellowish cast in the highlights; the blue-light-emitting phosphor slightly dominates the low intensity or shadow areas, and other areas may be substantially balanced, additively, therebetween.

A second embodiment comprehends the use of poisoned phosphors in the short stimulus set 54 of phosphors of target screen 48. By poisoning a white-light-emitting phosphor with small amounts of a metal such as iron, cobalt or nickel, the efficiency of emission may be modified as, for example, it may be lowered at low excitation intensities. For instance, it has been found possible to obtain an increase in emission by a factor of as much as one hundred when the irradiation has been increased by a factor of ten. This result was achieved by again employing a zinc sulphide phosphor, activated with silver and poisoned with nickel. Smaller deviations from linearity and greater efficiency at higher brightnesses can be obtained by employing smaller proportions of poison. Again, a yellow-emitting phosphor suitably poisoned with iron, nickel or cobalt so as to emit inefficiently at low excitation intensities may advantageously be combined with a blue-emitting phosphor such as ZnS:Ag which is less efficient at high excitation intensities.

In another embodiment, zinc sulphide activated with silver may be used as a linear blue-light-emitting phosphor in conjunction with substantially any common poisoned white-light-emitting phosphor as, for example, Hex-ZnS:Ag(0.015) combined with Hex-1.3ZnS.CdS:Ag(0.01), and with suitable additions of iron, cobalt, nickel or other poisons to give the latter the requisite degree of non-linearity at the desired irradiation intensity. It is also contemplated that each component of the white phosphor may advantageously be poisoned separately or that an ordinary white phosphor which contains a component emitting blue light of sufficiently short wavelength may be provided with its components poisoned differentially.

Further referring to the above-mentioned control of phosphor emission characteristics through modifications of the flux employed in formation of the phosphor, the latter may, for example, be prepared using a flux which produces or accentuates relatively poor emission characteristics at low excitation levels. Thus, for example, a zinc-cadmium sulphide phosphor activated by copper (ZnCdS:Cu), prepared with a calcium fluoride ($CaF_2$) flux instead of a conventional flux such as sodium chloride (NaCl) exhibits relatively small emission at low excitation levels. When the proportion of zinc sulphide (ZnS) to cadmium sulphide (CdS) is suitable, this is a yellow-emitting phosphor and emits more favorably at high excitation intensities when thus irradiated than at a low level. This phosphor is thus suitable for combination with a phosphor which is blue-light-emitting such as the aforementioned zinc sulphide phosphor activated with silver (ZnS:Ag).

Phosphors and phosphor combinations other than those hereinbefore enumerated but operating in a generally like manner may, alternatively, be employed for similar purposes and are considered to be within the scope of the present invention. The CIE chromaticity diagram of FIG. 3 illustrates the preferred colorimetric limits or locations of light emitted by short stimulus phosphors within which those phosphors and combinations previously specified are to be found and within which other phosphors, unnamed but of generally similar characteristic should lie. The chromaticity diagram shows the locations and wavelengths, in millimicrons, of pure spectral colors on the spectrum locus 56. A central white point is at 58. The ends of spectrum locus 56 are joined by the straight line 60 representing the mixture of violet and red ends of the spectrum at approximately 400 and 700 millimicrons, respectively. The $x$ and $y$ values are determined and the colors plotted on the chromaticity diagram in a generally conventional manner. The properties of a chromaticity diagram of the type of FIG. 3 have been defined by an international commission and are described in The Science of Color, published in 1953 by the Committee on Colorimetry, Optical Society of America, Thomas Y. Crowell Co., New York, New York, U.S.A.

More particularly referring to FIG. 3, there are shown the spectral characteristics of a selected phosphor or a given phosphor combination adapted to emit light at a low intensity of irradiation which is bluish relative to light at a high intensity and to emit light at a high intensity of radiation which is yellowish relative to light at a low intensity thereof, namely, a phosphor which is suitable for use as the non-red elements 54 of FIG. 2. The suitability of the phosphor can be determined by three conditions or requirements, as follows:

(a) The chromaticity of the light emitted due to a high intensity of irradiation should lie within the area bounded by the line 61.

(b) The chromaticity of the light emitted due to a low intensity of irradiation should lie within the area bounded by line 62.

(c) Assuming point 64 to represent the emission chromaticity of the phosphor at a high intensity and point 66 at a low intensity of irradiation, and considering line 68 as a vector indicating a direction from point 64 to point 66, said direction should be one lying between the directions represented by vectors 70 and 72, the latter having been chosen empirically by experiment.

As examples of satisfactory phosphor emission combinations, in terms of short stimulus image characteristics, it has been found that if highlights are white, shadows may appropriately be bluish. Other combinations are yellow highlights with gray or bluish shadows; greenish highlights with blue or blue-green shadows; and bluish highlights with blue shadows.

It is to be understood that the target screen phosphors may be disposed in directions other than that shown in FIG. 2 and that they may be composed of modified forms. Thus, for example, they may consist of solid lines alternatively composed of long and short stimulus phosphors. It is also to be understood that, instead of the target screen described, the receiver picture tube may comprise electroluminescent means such as a pair of superimposed layers as, for example, of a type disclosed in U.S. Patent No. 2,958,002. While the long record phosphors have been described herein as generally conventional it is possible that they may also consist of phosphors intentionally emitting differential colors under high and low irradiation for the purpose of improved color rendition. The present invention, while described with respect to presently accepted simultaneous television systems, may be adapted to use with systems involving sequential viewing means. Wherever the terms "black-and-white" or "white" light have been used herein with respect to image-forming components, they are to be interpreted as including the short stimulus components of the present invention which possess color characteristics of predominantly low saturation.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. Cathode-ray tube means comprising a target screen having two types of luminescent elements adapted to emit light differentially in response to differences in irradiation, one of said types of elements emitting light of a predominantly reddish color substantially irrespective of variations in irradation current density, and the other of said types of elements emitting light having a relatively bluish hue in response to a relatively low irradiation current density and a relatively yellowish hue in response to a relatively high irradiation current density.

2. Cathode-ray tube means, as defined in claim 1, wherein said lunminescent elements are phosphors having relatively different emission properties.

3. Cathode-ray tube means, as defined in claim 1, wherein said types of luminescent elements are sets of phosphors, said other type thereof being composed of a combination of phosphors one of which preferentially emits light of a yellowish hue responsive to a high excitation intensity and a bluish hue responsive to a low excitation intensity.

4. A bi-stimulus method of forming cathode-ray multicolor images of improved color characteristics, said method comprising the steps of generating a pair of color-separation irradiation signals for differentially exciting two different sets of target elements adapted to luminesce differentially in response to varying intensities of said irradiation signals, and causing one of said sets of target elements to luminesce in substantially a single color and the other of said sets in different colors responsive to differences in intensity of irradiation.

5. A television system for producing images exhibiting a gamut of colors, said system comprising pickup means for forming a pair of color-separation images representing, respectively, the predominantly warm color and the predominantly cool color content of the subject, transmission means for translating said images into electrical signals representative of said warm and cool color content, and receiver means for receiving and translating said signals into images representative of said color content, said last-named means comprising a kinescope including a target screen having one set of warm-color-emissive phosphors responsive to irradiation attributable to said warm-color signals, and a second set of phosphors adapted to emit two types of light, namely, light of a yellowish hue in response to high intensity irradiation attributable to said cool color signals and light of a bluish hue in response to low intensity irradiation attributable to said cool color signals.

6. In a television receiver cathode-ray tube for forming a multicolored image, a target screen including two sets of phosphors, intermingled throughout said screen in a predetermined arrangement, one set being adapted to luminesce in response to irradiation initiated by warm color pickup, transmission, and receiver signal information, and the other set being adapted to luminesce in response to irradiation initiated by cool color pickup, transmission, and receiver signal information derived from subject matter undergoing scanning, said one set comprising a phosphor which, when irradiated, emits light of a predominantly reddish color, and said other set comprising a combination of phosphors one of which, when irradiated, emits light inefficiently at a low level of excitation and efficiently at a high level of excitation, while the other phosphor of the combination simultaneously emits light efficiently at a low level of excitation and inefficiently at a high level of excitation.

7. In a television receiver cathode-ray tube for forming a multicolored image, a target screen, as defined in claim 6, wherein said phosphor emitting light efficiently at a high level of excitation substantially provides emitted light of a yellowish color, and said phosphor emitting light efficiently at a low level of excitation subsantially provides emitted light of a bluish color.

8. In a television receiver cathode-ray tube for forming a multicolored image, a target screen, as defined in claim 6, wherein said phosphor emitting light efficiently at a high level of excitation emits predominantly white light, and said phosphor emitting light efficiently at a low level of excitation emits light of a predominantly bluish color.

9. In a television receiver cathode-ray tube for forming a multicolored image, a target screen, as defined in claim 6, wherein said phosphor emitting light efficiently at a high level of excitation emits predominantly greenish light, and said phosphor emitting light efficiently at a low level of excitation emits light of a predominantly bluish color.

10. In a television receiver cathode-ray tube for forming a multicolored image, a target screen, as defined in claim 6, wherein said phosphor emitting light efficiently at a high level of excitation emits predominantly bluish light, and said phosphor emitting light efficiently at a low level of excitation emits light of a predominantly blue color.

11. A television system for producing images exhibiting a gamut of colors, said system comprising:

pickup means for forming a plurality of color-separation images representing predominantly warm color and predominantly cool color contents of a subject;

transmission means for translating said images into electrical signals representative of said warm and cool color contents;

receiver means for receiving and translating said signals into images representative of said color content, said last-named means comprising a kinescope including a target screen having a warm-color emissive phosphor responsive to irraidation attributable to said warm-color signals, and a set of phosphors adapted to emit two types of light having different dominant wavelengths in response to irradiation attributable to said cool color signals, and means for selectively exciting emissions from at least said second set of phosphors in varying proportions to produce substantially achromatic image components in warm and cool hues selectively.

12. A television receiver comprising:

a kinescope for forming a multi-colored image and having a target screen comprising a first phosphor capable of emitting light of a predominantly reddish color when excited and a set of phosphors capable of emitting light of selectively variable non-red hues when excited, receiver means for exciting said first phosphor to produce reddish image components in response to receiver signals representing relatively warm color information derived from subject matter undergoing scanning and for exciting at least said set of phosphors simultaneously but in varying ratios in response to receiver signals representing relatively cool color information derived from said subject matter to produce substantially achromatic image components of relatively warm and relatively cool hues respectively.

13. A color display system for producing colored images from a plurality of color separation records, said system comprising:

a viewing screen including a first phosphor which when energized emits light of relatively long wavelengths, a second phosphor which when energized emits light of wavelengths generally shorter than that emitted by said first phosphor, and a third phosphor which when energized emits light of wavelengths generally shorter than that emitted by said second phosphor, means for exciting said first phosphor in response to relatively long wavelength records thereby to produce corresponding image components in light of said relatively long wavelengths, and means for selectively exciting emissions of at least said second and third phosphors in varying proportions to produce substantially achromatic image components in warm and cool hues selectively.

14. A color display system for producing colored images from a plurality of image-forming color separation records from which coordinated signals are sent from a color television transmitter, said system comprising:

a viewing screen including a distribution of a first phosphor which when sequentially energized in successive portions emits light of relatively long wavelengths, a distribution of a second phosphor which when sequentially energized in successive portions emits light substantially shorter in dominant wavelength than that emitted by said first phosphor, and a distribution of a third phosphor which when sequentially energized in successive portions emits light of wavelengths generally shorter than that emitted by said second phosphor, means for energizing in a sequence portions of said first phosphor in response to first signals from a first of said records thereby to produce corresponding image components in light of said relatively long wavelengths, means for independently and in the same sequence simultaneously energizing coinciding portions of at least said second and third phosphors in controllably varying ratios in response to additional signals from said records thereby to produce corresponding image components in substantially achromatic light of controllably varying warm and cool hues.

15. A color display system for producing colored images from a plurality of dissimilar color separation records, said system comprising:

a viewing screen including at least three phosphors which when energized emit light of relatively different dominant wavelengths, means for exciting one of said phosphors in response to a relatively long wavelength one of said records thereby to produce corresponding image components in light of relatively long wavelengths, and means for selectively exciting emissions from a plurality of said phosphors simultaneously and in varying proportions to produce achromatic image components of relatively warm and cool hues selectively.

References Cited by the Examiner

UNITED STATES PATENTS

| | | | |
|---|---|---|---|
| 2,580,073 | 12/1951 | Burton | 178—5.4 |
| 2,892,116 | 6/1959 | Willer | 313—92.5 |
| 3,003,391 | 10/1961 | Land | 88—16.4 |
| 3,122,670 | 2/1964 | Rudatis | 313—92.5 |

DAVID G. REDINBAUGH, *Primary Examiner.*

J. A. O'BRIEN, *Assistant Examiner.*